United States Patent [19]

Hunter

[11] 4,085,771
[45] Apr. 25, 1978

[54] ANGULARITY SENSOR MEANS FOR CENTER PIVOT IRRIGATION SYSTEM

[75] Inventor: Edwin J. Hunter, Rancho Santa Fe, Calif.

[73] Assignee: The Toro Company, San Marcos, Calif.

[21] Appl. No.: 731,695

[22] Filed: Oct. 12, 1976

[51] Int. Cl.² ............................................. B05B 3/12
[52] U.S. Cl. .................................. 137/344; 239/177; 239/212
[58] Field of Search ................ 137/344; 239/177, 212, 239/213

[56] References Cited
U.S. PATENT DOCUMENTS 3,394,729  7/1968  Bower et al. .................. 137/344

Primary Examiner—Alan Cohan
Assistant Examiner—Gerald A. Michalsky
Attorney, Agent, or Firm—Poms, Smith, Lande & Glenny

[57] ABSTRACT

A center pivot irrigation system has a plurality of self-propelled articulated span units mounting interconnected sections of water carrying conduit, each span unit has motor means and motor control means for regulating the operation of the associated motor means to maintain the span units in a pre-determined relative alignment in a vertical plane revolving about a vertical line at the center pivot of the system; the control means has angularity sensor means which is connected between span units for sensing in a substantially horizontal plane changes in angularity between the span units relative to the desired revolving vertical plane.

9 Claims, 7 Drawing Figures

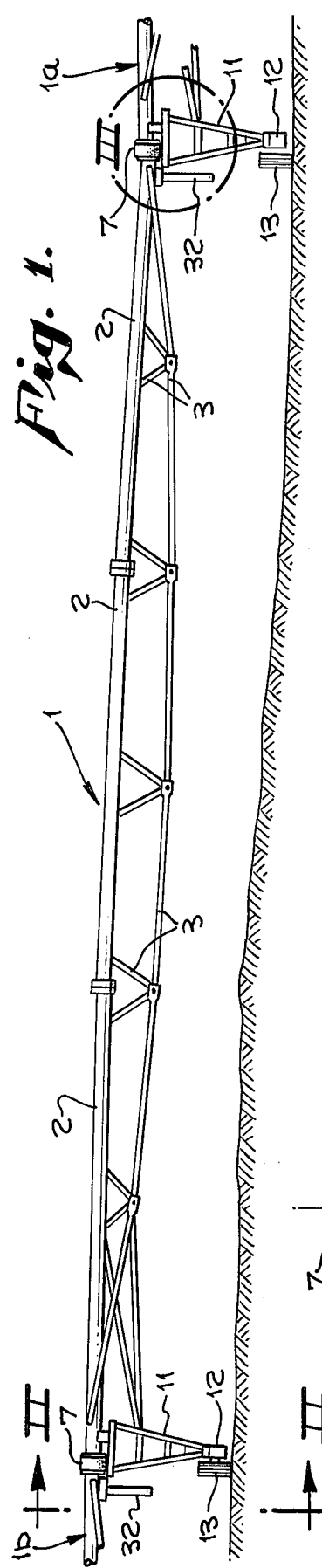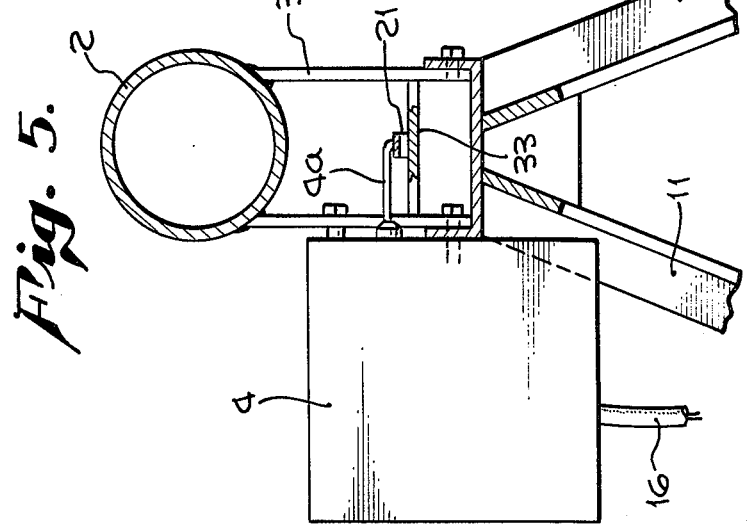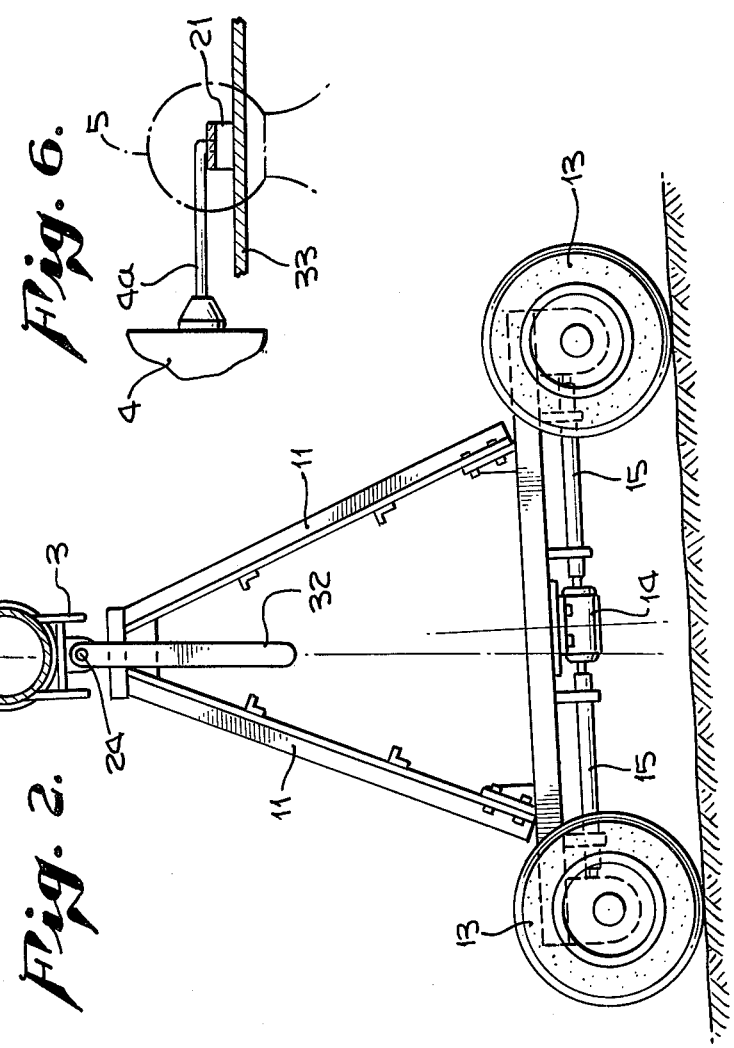

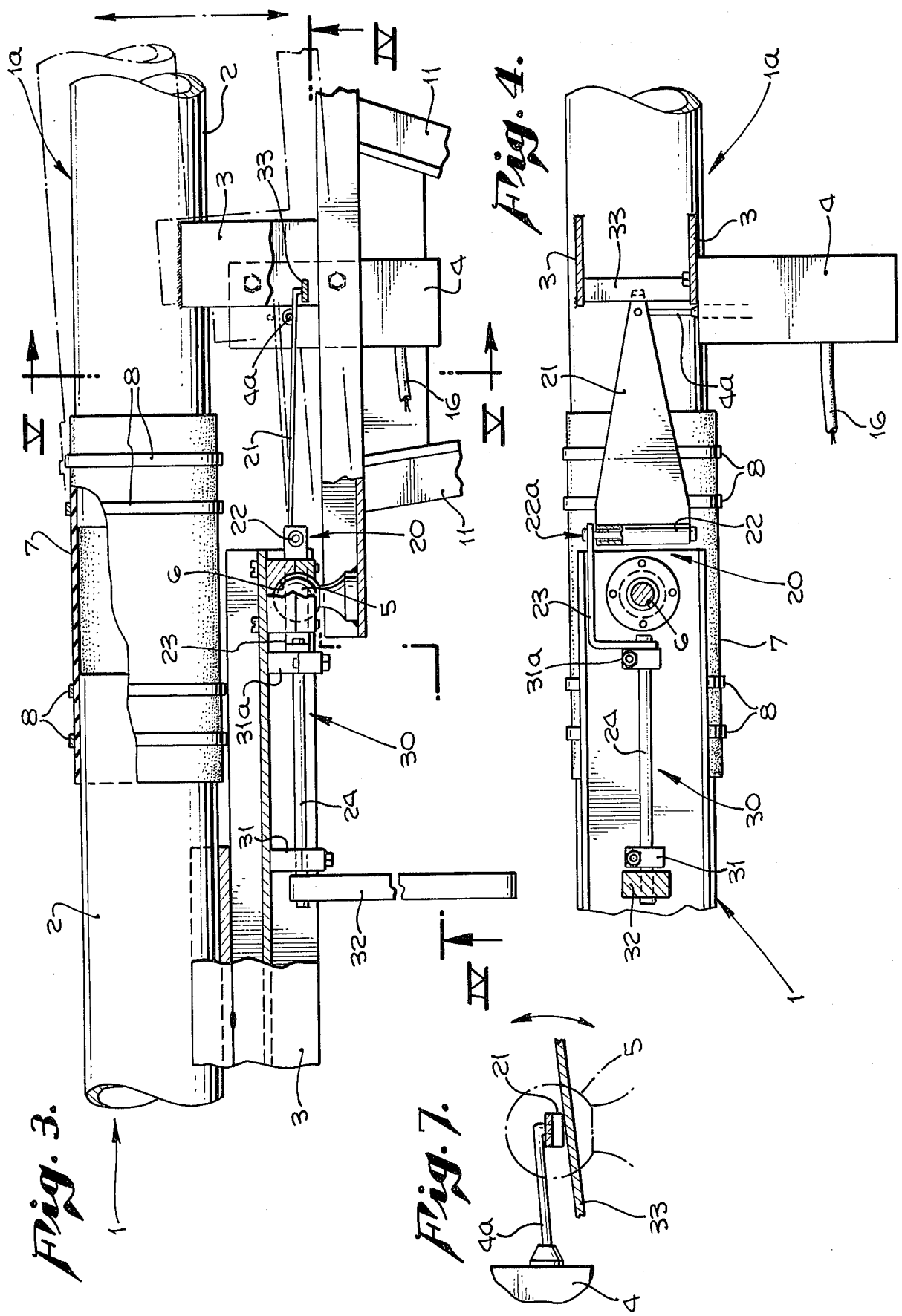

ANGULARITY SENSOR MEANS FOR CENTER PIVOT IRRIGATION SYSTEM

BACKGROUND OF THE INVENTION

The present invention relates in general to self-propelled center pivot irrigation systems which are comprised of a plurality of self-propelled articulated span units which mount interconnecting sections of water carrying conduit, each such span unit having drive motor means and motor control means which regulate the operation of the drive motor means to maintain the span units in pre-determined relative alignment. In particular, the present invention relates to the control means which regulate the operation of the drive motor means.

The preferred relative alignment for the individual span unit of the system is accomplished when the units are in essentially a straight longitudinal array with the individual units revolving about the center pivot of the system aligned in an imaginary true vertical plane revolving about an imaginary truely vertical line located co-axial with the system center pivot. "True Vertical" as used herein is the indication of vertical as provided by a so called "spirit" level or a plumb-bob suspended on a plumb line, i.e., truely vertical as to the gravitational center of the earth.

Heretofore, it has been common in such articulated systems to connect a sensor arm to one span unit and to have the sensor arm operationally interact with a motor control actuator mechanism of an adjacent span unit. It has been found in these prior embodiments that the use of a rigidly mounted sensor arm will measure changes in angularity in a plane perpendicular to the vertical plane of its unit only and thus transmit spurious signals to the motor control actuator mechanism when the self-propelled irrigation system traverses uneven terrain. Specifically, when the span units are travelling either uphill or downhill, there is a rotational motion relative to the longitudinal axis of the span units as well as a vertical displacement of span units relative to adjacent span units. This rotative motion of the span units and vertical displacement of the span units have caused prior motor controls to sense changes in angularity relative to a false vertical and thus transmit signals to the drive motor control which were not related to the desired relative alignment of the units in the true vertical plane. Rather, these prior sensors have given erroneous control directions causing over misalignment and the systems even to shut down.

SUMMARY OF THE INVENTION

It is therefore a primary object of the present invention to disclose and provide an improved angularity sensor means for center pivot type irrigation systems which is sensitive to changes in angularity between adjacent span units of the system relative to a desired true vertical over the entire longitudinal extent thereof.

It is another object of the present invention to disclose and provide an improved angularity sensor means for sensing in a substantially horizontal plane the changes in angularity of individual units relative to an imaginary truely vertical plane revolving about an imaginary truely vertical line located coaxial with the center pivot of a center pivot type irrigation system employing a plurality of individually driven interconnected water conduit carrying span units.

Generally stated, the present invention in improved angularity sensor means for use with the motor control means associated with one or more of a plurality of self-propelled articulated span units of a center pivot irrigation system includes the provision of sensor means mounted to the units in a continuing predetermined attitude relative to the true vertical during rotative movement of said units when traversing rough terrain whereby the sensor means measures changes in angularity relative to the desired true vertical plane between adjacent span units rather than only relative to the rotating false vertical plane of the individual units.

More simply stated, sensor means are provided on at least one of the adjacent span units for sensing changes in angularity between the span unit to which it is attached and the adjacent span unit relative to a true vertical plane and for activating motor drive means in response only to such changes in angularity between said adjacent span units as have occurred in the horizontal direction relative to the revolving vertical plane of the system during conditions of angular displacement in a vertical direction and rotative misalignment of said adjacent span units.

More specifically, mounting means are provided for mounting a sensor arm to each of a plurality of units in a manner for maintaining the arm axes substantially horizontal during rotative movement of the span units relative to their longitudinal axes. The mounting means preferably comprises a mounting member rotatably journalled on the associated span unit to rotate about an axis parallel to a longitudinal axis of the span unit. Pendulum means are attached to the mounting member to maintain the mounting member in a pre-determined attitude relative to the true vertical during rotative movement of the adjacent span unit. The sensor means of the present invention is thus gravitationally maintained in an operational attitude. Hinge means are preferably provided on an end of the mounting member and connected to the control arm for mounting the control arm for arcuate movement about a horizontal axis which is maintained virtually horizontal during rotative motion of the span unit and vertical displacement relative to the adjacent unit. The control arm contacts a control rod of the motor control means to operate the motor control in response to changes in angularity of the unit relative to the desired vertical plane.

A more complete understanding of the improvements in control means in accordance with the present invention, as well as a recognition of additional objects and advantages therefor, will be afforded to those skilled in the art from a consideration of the following detailed description of an exemplary embodiment thereof. Reference will be made to the appended sheets of drawings which will first be discussed briefly.

BRIEF DESCRIPTION OF THE DRAWINGS

FIG. 1 is a side view of a portion of a self-propelled center pivot irrigation system showing one complete span unit and its connection between two other span units.

FIG. 2 is a partial end sectional view taken through the plane II—II of FIG. 1 showing a detail of a power frame which propels the span unit.

FIG. 3 is a partial side-sectional view showing in detail the region III—III of FIG. 1, which region contains the control means of the present invention.

FIG. 4 is a plan view taken through the plane IV—IV of FIG. 3 showing in particular the sensor means of the present invention.

FIG. 5 is partial end-sectional view taken through the plane V—V of FIG. 3.

FIG. 6 is a detail view of the interaction between the control arm and the control arm support.

FIG. 7 is detail view of the interaction between the control arm and the control arm support when the self-propelled irrigation system is traversing uneven terrain which causes a rotational movement of a span unit relative to a longitudinal axis thereof.

DETAILED DESCRIPTION OF AN EXEMPLARY EMBODIMENT

Referring first to FIG. 1, a section of a center pivot irrigation system is shown. The irrigation system has a plurality of articulated self-propelled span units, one of which is shown generally at 1. As seen in FIG. 2 each span unit has motor means 14 connected by drive shaft 15 to drive wheels 13, all mounted to wheel truck 12 which in turn supports carriage frame 11. Water carrying conduit sections 2, which are interconnected by means of flexible joints 7 which are secured by clamps 8, are mounted on carriage frame 11 and are supported by support truss assembly 3, as may be seen in FIGS. 2 and 5. Motor control means 4 are provided for regulating the operation of the associated motor means 14 to maintain the associated span unit 1 in proper alignment with an immediately adjacent succeeding (relative to the inner center pivot end) span unit and is mounted to carriage frame 1, as best seen in FIG. 5.

In operation, an initial span unit 1a is rotatably connected to a source of water. This initial span unit 1a, shown partially at the right hand end of FIG. 1, is free to rotate about a conventional center pivot (not shown) propelled by its associated drive motor and drive wheels, thereby irrigating a circular area. To cover a larger area, additional span units, as units 1 and 1b in FIG. 1, are subsequently attached by means of conventional connectors such as connector ball 5 and connector socket 6 as shown in FIGS. 3 and 4. The associated conduits are interconnected by flexible joints as joint 7, which is secured by clamps 8, to form a linearly aligned system, the length of which determines the radius of the circular area to be irrigated.

Each span unit is provided with separate drive motor 14 and associated drive wheels 13. As is readily apparent a span unit near the center of the area being irrigated travels a shorter distance in one revolution about the center pivot than do any of the further outboard succeeding (to the left in FIG. 1) span units.

The outer-most or terminal span unit is required to travel the greatest distance, and, as it is desirable for the system to remain aligned linearly in an imaginary truely vertical plane revolving with the units about a truely vertical line coaxial with the center pivot of the system, the terminal span unit must travel the circumference of the large outer circle in the same time period that the inner-most or initial span unit is traveling the circumference of a relatively smaller inner circle. An indication of the relative velocities between the initial and the terminal span units, based upon a system length of 12 span units, is approximately 12:1.

The terminal span unit, or an intermediate unit, may be driven at a predetermined selected speed as the "master" unit. When the angular displacement between the master span unit and an adjacent span unit exceeds a pre-selected value, that is when the master span unit gets too far "ahead", the motor control means of the adjacent span unit initiates the operation of its associated drive motor in a catch up effort. This adjacent span unit should be so driven until the angular displacement between the span units exceeds a pre-selected value in the opposite direction, that is when the adjacent span unit gets too far "ahead" of the terminal unit, at which time the motor control means stops or slows the drive motor of the adjacent span unit until the master span unit "catches up".

As is readily apparent, when the terminal span unit is the "master" span unit then the immediately adjacent preceding span unit is the "slave" unit. This sequence continues seriatim, with each span unit acting as the "master" to the span unit which immediately precedes it, continuing to the span unit attached to the center pivot. This initial span unit is the ultimate "slave" unit within the system.

As particularly contemplated with the present invention, the motor control means of the exemplary embodiment includes the within improvement in angularity sensing means which is shown generally at 20 in FIG. 4, one of which is connected between each span unit and an adjacent succeeding span unit. The angularity sensing means 20 is associated with and initiates responses by motor control means 4 by sensing changes in angularity between the span units with which it is associated relative to the true vertical over the longitudinal extent thereof as hereinafter explained.

Each angularity sensing means 20 as seen in FIGS. 3 and 4 has a control arm 21 mounted for vertical angular movement relative to a horizontal axis on the associated span unit, as span unit 1, and has a free end thereof engaging the adjacent span unit 1a, as is most clearly shown by FIGS. 3 and 4.

In the exemplary embodiment, control arm 21 is attached to the immediately succeeding "master" span unit 1 and the vertically movable free end is connected to and associated with the motor control 4 of the immediately preceding "slave" span unit 1a. Control arm 21 operates the motor control of the "slave" span unit 1*1* upon changes in angularity occurring in a substantially horizontal plane relative to a desired true vertical plane for the units as hereinafter explained.

Referring to FIGS. 3 and 4, mounting means, indicated generally at 30, are provided for mounting control arm 21 to span unit 1 and for maintaining control arm 21 and an axis thereof virtually horizontal during rotative movement of span unit 1 relative to its longitudinal axis which causes the vertical plane of the units to rotate out of a true vertical plane. In the exemplary embodiment, mounting means 30 comprises a mounting member 24 rotatably journalled in bearing members 31 and 31a on span unit 1. Mounting member 24 is free to rotate about an axis parallel to a longitudinal axis of span unit 1. Pendulum means 32 is attached to mounting means 30 to maintain mounting means 30 in a predetermined attitude relative to the true vertical during rotative motion of span unit 1.

As the span units traverse uneven terrain and the wheel truck 12 tilts thereby tilting carriage frame 11, the span unit is generally rotated about the longitudinal axis of conduit 2. When this occurs, pendulum means 32 is gravitationally urged into a truly vertical position. In assuming this position, mounting member 24 is rotated within bearing members 31 and 31a and control arm 21 is positioned parallel to the true horizontal. Thus, pendulum means 32 acting in concert with rotatably journalled mounting member 24, maintains control arm 21 truly horizontal during rotative movement of span unit 1 relative to is longitudinal axis.

Hinge means 22 is provided on an end of mounting member 24 and connects control arm 21 thereto. Axis 22a of hinge 22 between control arm 21 and mounting member 24 is maintained horizontal during rotative motion of span unit 1 relative to a longitudinal axis thereof. However hinge means 22 allows control arm 21 to be freely vertically moveable with respect to the true horizontal. This prevents the transmission of spurious signals to control means 4 by control arm 21 which might be generated by a vertical displacement of either of span unit 1 and 1a with respect to the other of said span units.

As shown in FIG. 6, control arm 21 interconnects with actuator rod 4a of motor control 4. Control arm support 33, which is generally horizontal when span unit 1 is not undergoing rotative motion, is seen to contact the entire under surface of terminal portion of control arm 21. However, upon rotative motion of span unit 1, control arm support 33 is also rotated. This rotation results in an angular displacement between control arm 21 and control arm support 33, as is best seen in FIG. 7. It sould be noted that the relationship between control arm 21 and activator rod 4a does not change appreciably during the rotative motion of span unit 1 and control arm support 33. Additionally, crank arm 23 is provided to prevent any interference between mounting member 24 and connector ball 5 and connector socket 6 which ball and socket connect span units 1 and 1a.

Thus, it can be seen that sensor means, according to the present invention, senses changes in angularity between span units 1 and adjacent span unit 1a relative to the true vertical plane desired therefor. Preferably, these changes are measured in a virtually horizontal plane during unit rotation with means for compensating for vertical displacement between units. Specifically, sensor means 20 is gravitationally maintained in an operational attitude wherein, hinge axis 22a of hinge 22 is always substantially horizontal and control arm 21 is free to move in a vertical direction in response to changes in vertical alignment between adjacent span units 1 and 1a without initiating a response by motor means 14.

As will now be apparent to those skilled in the art the objects of the present invention are attained by the preffered exemplary embodiment in that the plurality of interconnected individually driven span units operate in alignment in a vertical plane which revolves about an imaginary plumb-line co-axial with the center pivot of the system. The angularity of each units deviation from this desired vertical plane is measured, preferably in a true horizontal plane, and corrective measures are taken to bring the deviating unit back to the desired true vertical plane.

Having thus described an exemplary embodiment of an improved control means for controlling the drive motor of a self-propelled span unit in a center pivot irrigation system, it should be understood by those skilled in the art that various alternatives and modifications thereof may be made within the scope and spirit of the present invention which is defined by the following claims.

I claim:

1. In a center pivot irrigation system having a plurality of self-propelled articulated span units mounting inter-connected sections of water carrying conduit, each such span unit having motor means and motor control means for regulating the operation of the associated motor means to maintain said span units in a pre-determined relative alignment, the improvement in control means comprising the provision of:
   angularity sensor means operable between at least one of said span units and an adjacent span unit and connected with the motor control means of one of said span units for sensing changes in angularity between said span unit and said adjacent span unit, said angularity sensor means having means for sensing said changes in angularity relative to a plane truely vertical to the earth.

2. In a center pivot irrigation system having a plurality of self-propelled articulated span units mounting interconnected sections of water carrying conduit, each such span unit having motor means and motor control means for regulating the operation of the associated motor means to maintain said span units in a pre-determined relative alignment, the improvement in control means comprising the provision of:
   angularity sensor means operable between at least one of said span units and an adjacent span unit and connected with the motor control means of one of said span units for sensing changes in angularity between said span unit and said adjacent span unit relative to a truely vertical plane through one of said units, wherein said sensor means comprises:
   a control arm mounted for vertical angular movement about a horizontal axis thereof on one of said span units and having an end thereof engaging the other of said span units, said control arm being associated with said motor control means to operate the latter upon changes in angularity between said units relative to said truely vertical plane.

3. The improvement in a center pivot irrigation system of claim 2, wherein said sensor means comprises:
   mounting means for mounting said control arm to said one of said span units for maintaining said control arm axis virtually horizontal during rotative movement of either of said span units relative to their longitudinal axes for measuring said changes relative said truely vertical plane in a horizontal direction.

4. The improvement in a center pivot irrigation system of claim 3, wherein said sensor means comprises:
   a mounting member rotatably journalled on said one of said span units to rotate about an axis parallel to a longitudinal axis of said unit;
   pendulum means attached to said mounting member to maintain said member in a pre-determined attitude relative to the true vertical during rotative motion of said unit;
   a control arm connected to said motor control means; and
   hinge means on an end of said mounting member and connected to said control arm for mounting said control arm to pivot about a horizontal axis which is maintained substantially horizontal during rotative motion of the associated span unit relative to a longitudinal axis thereof.

5. In a center pivot irrigation system having a plurality of self-propelled span units mounting interconnected water conduit sections, wherein each unit includes its own motor drive means and means for regulating the operation of said motor drive means in response to changes in angularity between said span unit and an adjacent span unit to maintain said span units in a generally linear relation, the improvement in said motor drive regulating means comprising the provision of:

sensor means on at least one of said span units for sensing changes in angularity between said span unit and an adjacent span unit relative to an imaginary truely vertical plane relative to the earth and extending through said units and revolving therewith about a vertical line through the center pivot of the system and for activating one of said span units motor drive regulating means in response only to such changes in angularity between said adjacent span units as occurred relative to said truely vertical plane relative to the earth during conditions of angular displacement in a vertical direction and rotative misalignment of said adjacent span units.

6. In a center pivot irrigation system having a plurality of self-propelled span units mounting interconnected water conduit sections, wherein each unit includes its own motor drive means and means for regulating the operation of said motor drive means in response to changes in angularity between said span unit and an adjacent span unit to maintain said span units in a generally linear relation, the improvement in said motor drive regulating means comprising the provision of:

sensor means on at least one of said span units for sensing changes in angularity between said span unit and an adjacent span unit relative to an imaginary truely vertical plane extending through said units and revolving therewith about a vertical line through the center pivot of the system and for activating one of said span units motor drive regulating means in response only to such changes in angularity between said adjacent span units as occurred relative to said truely vertical plane during conditions of angular displacement in a vertical direction and rotative misalignment of said adjacent span units, wherein said sensor means includes means for gravitationally maintaining it in a predetermined operational attitude relative the true vertical.

7. In a center pivot irrigation system comprising a plurality of individual linearly interconnected span units each said span unit comprising means for supporting a pivotal point of interconnection between said span unit and an adjacent succeeding other one of said span units, motor means for propelling said span unit, and control means for regulating the operation of said motor means to maintain alignment with an adjacent succeeding span unit, said control means comprising:

sensor means connected between said adjacent span units for sensing angular displacement between said adjacent span units and for initiating a corrective response by said motor means, and said connector means being responsive only to angular displacement between said adjacent span units in a substantially horizontal direction relative to a truely vertical plane relative to the earth whereby, spurious signals to said motor means due to axial rotation between said adjacent span units are prevented.

8. The improvement in center pivot irrigation system of claim 7 wherein said sensor means comprises:

mounting means for mounting a portion of said sensor means rotatable about an axis parallel to a longitudinal axis along said adjacent span units and gravity responsive means for rotatably positioning said sensor means portion in a constant attitude with respect to the vertical regardless of any axial rotation of said span units.

9. The improvement in center pivor irrigation system of claim 7 wherein said sensor means comprises:

hinge means intermediate two end portions of said sensor means for allowing a first one of said end portions to move independently in a vertical direction with respect to the other of said end portions, said hinge means including a axis and means for maintaining said axis in a horizontal plane whereby, any vertical angular displacement between said adjacent span units is compensated for by said hinge means and does not initiate a response by said motor means.

* * * * *